United States Patent
Remizov (10) Patent No.: US 9,009,332 B1
(45) Date of Patent: Apr. 14, 2015

(54) PROTECTION AGAINST NETWORK-BASED MALICIOUS ACTIVITY UTILIZING TRANSPARENT PROXY SERVICES

(71) Applicant: Kaspersky Lab ZAO, Moscow (RU)

(72) Inventor: Boris Y. Remizov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/335,221

(22) Filed: Jul. 18, 2014

(51) Int. Cl.
G06F 15/16 (2006.01)
H04L 29/06 (2006.01)
H04L 12/931 (2013.01)

(52) U.S. Cl.
CPC ............ *H04L 63/1416* (2013.01); *H04L 49/20* (2013.01)

(58) Field of Classification Search
None
See application file for complete search history.

(56) References Cited

U.S. PATENT DOCUMENTS

| | | | |
|---|---|---|---|
| 6,975,647 B2 | 12/2005 | Neale et al. | |
| 7,161,947 B1 | 1/2007 | Desai | |
| 7,478,155 B2 * | 1/2009 | Couturier et al. | 709/224 |
| 7,706,314 B2 | 4/2010 | Nedeltchev | |
| 7,743,160 B2 | 6/2010 | Li et al. | |
| 8,130,747 B2 | 3/2012 | Li et al. | |
| 8,140,687 B2 | 3/2012 | Roy et al. | |
| 8,238,241 B2 * | 8/2012 | Samuels et al. | 370/230.1 |
| 2001/0040697 A1 * | 11/2001 | Wu et al. | 358/1.15 |
| 2001/0050925 A1 * | 12/2001 | Mesiwala et al. | 370/503 |
| 2002/0027880 A1 * | 3/2002 | Mesiwala | 370/252 |
| 2007/0240209 A1 * | 10/2007 | Lewis et al. | 726/15 |
| 2011/0299554 A1 * | 12/2011 | Ros-Giralt et al. | 370/469 |
| 2012/0054583 A1 * | 3/2012 | Park et al. | 714/776 |
| 2012/0269150 A1 * | 10/2012 | Delorme et al. | 370/329 |
| 2014/0286313 A1 * | 9/2014 | Fu et al. | 370/331 |

FOREIGN PATENT DOCUMENTS

| | | |
|---|---|---|
| CA | 2679951 A1 | 9/2008 |
| CA | 2806548 A1 | 2/2012 |

OTHER PUBLICATIONS

Squid Cache Proxy. 20 Pages. Created Apr. 23, 2013.
Crocker et al., "Fault-Tolerant Reconfigurable Ethernet-Based IP Network Proxy", Mississippi State University. Department of Electrical and Computer Engineering. 20 pages. (2004).
Wessels, "Web Caching", O'Reilly Online Catalog. Chapter 5 Interception Proxying and Caching. 21 pages. Jun. 2001.
The Remote Socket Architecture: A proxy based solution for TCP over wireless. 234 pages. Berlin. May 24, 2004.

* cited by examiner

*Primary Examiner* — Brian P Whipple
(74) *Attorney, Agent, or Firm* — Patterson Thuente Pedersen, P.A.

(57) ABSTRACT

Transparent proxy services are provided reliably. A TCP/IP input stream is received that includes data and control packets directed to a destination address that is different from a network address of the proxy. Incoming TCP data packets and control packets are intercepted. Intercepted data packets are processed asynchronously with respect to reception of other TCP data packets. At the start of the processing, an indicator is set to represent an active state of the processing; at the conclusion of the processing an output of the processing is sent to a determined destination for the first TCP data packet, and the indicator is set to represent a non-active state of the processing. In response to the state of the indicator representing the active state of the processing, control packets are delayed by the proxy.

18 Claims, 8 Drawing Sheets

FIG. 6

PROTECTION AGAINST NETWORK-BASED MALICIOUS ACTIVITY UTILIZING TRANSPARENT PROXY SERVICES

FIELD OF THE INVENTION

The invention relates generally to information processing and communications technologies and, more particularly, to computer-based security technologies employing a reliable network traffic interceptor, such as a transparent proxy service for instance.

BACKGROUND OF THE INVENTION

Modern computing systems and software increasingly rely on live connections to the Internet. There is a growing number of applications for which the Internet connection is a mandatory operation condition; the volume of data being transferred through the network is growing as well. At the same time, the organization of the network connectivity is becoming more complex and of larger scale, which, in turn, affects the quality and speed of data transfer.

A proxy server is often used to ensure Internet access for local area network computers. Generally speaking, a proxy server is a network service, which is sometimes required to establish a connection between an application and a remote server on the Internet. The operation of a proxy server is based on a mechanism for interception and redirection of connections. The implementation of such a mechanism is performed using various APIs (Application Programming Interfaces) provided by modern operating systems, which have functions for interaction with network ports and connections. A proxy server can reside on a server situated remotely from the client receiving the benefit of the proxy server's operation. Also, a proxy server can be implemented as part of a firewall on a networking device such as a switch or router. Another implementation of a proxy is on the local computing system itself, such as part of a firewall or other component of a security application or of the operating system. Data flow is passed through the proxy, which can monitor, filter, and redirect the data packets as needed according to the beneficial service to be provided by the proxy. For instance, to protect users working on local computer systems, a proxy can analyze the connections to Internet addresses, and block or redirect network traffic if a connection is suspected of exposing the user's computer system to undue risk (such as the risk of malware or hacker attack). A variety of data processing operations can be performed by the proxy to this end.

A transparent proxy, also referred to as an intercepting proxy, intercepts normal communication at the network layer without requiring any special client configuration. As its name implies, clients need not be aware of the existence of the transparent proxy. A transparent proxy is normally located between the client and the Internet, with the proxy performing some of the functions of a gateway or router. Typically a transparent proxy intercepts network traffic, namely data packets, using such techniques as filter drivers and callbacks associated with events occurring on the monitored transmission control protocol (TCP) socket. In a typical layered networking architecture, TCP is implemented at the transport layer, and provides an interface between applications at a higher layer and a lower internet layer that uses internet protocol (IP).

One challenge in operating a transparent proxy is managing the flow of data from each sender to the intended recipient. In proxies that perform significant on-board processing such as protection of users against malicious activity, for instance, the time needed to perform such processing can interfere with typical or expected data flow on the sender's or recipient's respective sides. For example, TCP requires the exchange of control bits such as SYN, ACK, and FIN in IP datagrams. Conventional transparent proxies tend to pass these control datagrams through to the recipient without processing, since these are not data-bearing packets of interest to the protection functionality. This can create problems where, for instance, a call for closing a connection (i.e., using the FIN control bit) can be passed through to the recipient before all of the data being processed by the proxy has been delivered. This scenario of events can result in loss of the data being processed without either side becoming aware of that loss.

An effective and practical solution is therefore needed to manage errors associated with the use of transparent proxies.

SUMMARY OF THE INVENTION

One aspect of the invention is directed to a method for providing transparent proxy services, to be carried out by computing system that includes a processor, data storage, and input/output devices including a network interface device. A TCP/IP input stream is received that includes data and control packets directed to a destination address that is different from a network address of the computing system. In response to the receiving, TCP data packets are intercepted. In response to the intercepting of a first TCP data packet that data packet is processed asynchronously with respect to reception and handling of TCP data packets. Asynchronous processing refers to running processes that do not depend on each other's output, and can therefore are processed simultaneously as different threads. This is in contrast to synchronous processing, where processes wait for one to complete before the next begins. In response to a start of the processing an indicator is set to represent an active state of the processing. In response to a conclusion of the processing an output of the processing is sent to a determined destination for the first TCP data packet. Also, the indicator is set to represent a non-active state of the processing.

Also in response to the receiving of the ICP/IP input stream, TCP control packets are intercepted. In response to intercepting of a first TCP control packet, a state of the indicator is checked. In response to the state of the indicator representing the active state of the processing, sending of the first control packet is delayed. In response to the state of the indicator representing the non-active state of the processing, the first control packet is sent to a determined destination for the first control packet.

A system for providing reliable proxy services includes computing hardware, e.g., a processor, data storage, and input/output devices including a network interface device. Instructions are executable on the computing hardware and stored in a non-transitory storage medium that, when executed, cause the computing hardware to implement a combination of modules that interact with one another. These include: a data interception module configured to intercept incoming TCP/IP data packets; a control interception module configured to intercept TCP/IP control packets; a processing module configured to process a first intercepted TCP data packet asynchronously with respect to reception of other TCP data packets; an indicator module configured to monitor an operational state of the processing module, and to provide an indication representing that state as being either active or inactive, based on a result of monitoring the operational state; a delay module configured to delay retransmission of a first received control packet in response to the operational state of the processing module being active, as indicated by the indicator module, and to retransmit the first received control packet in response to the operational state being inactive, as indicated by the indicator module; and an output module configured to transmit an output of the processing module and an output of the delay module based on a determined destination for each corresponding output.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Asynchronous processing"—executing processes that are not temporally coordinated with one another and that do not depend on each other's output, and can therefore be processed simultaneously as different threads. In asynchronous processing, processes do not wait for one to complete before the next may begin.

"Computer," "Computer system", and "Computing System"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computer systems can be stand-alone devices, or embedded devices that are part of a larger device or system.

"Data storage"—One or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Flag"—a binary indicator stored in the computer hardware.

"Input/output devices"—Electronic hardware part of a computer system that facilitate the flow of information into, and out of, the computer system. Examples include a network interface device, a monitor, a keyboard, a mouse, a printer, a serial port, etc.).

"Intercepting"—reading and capturing data packets by an intermediary process (such as a proxy) that are directed to a destination, thereby holding those data packets from proceeding until the data packets are released. While being held, the intercepted data packets can be re-directed, altered, dropped, delayed, or otherwise acted upon by the intermediary process.

"Network interface device"—A type of input/output device that facilitates communication of information to an external computing device over a computer network. Examples include an Ethernet port, a Wi-Fi radio interface, a Bluetooth™ interface, etc.

"Operating system," ("OS")—Software executable on computer hardware that handles functions for interaction with network ports and connections, peripherals, scheduling of tasks, allocation of data storage, and presents a default interface to the user when no application program is running Examples include the Windows™ family of operating systems by Microsoft Corporation, Mac OS by Apple Inc., Unix, Linux, iOS, Android, etc.

"Processor"—Electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Proxy," "Proxy server," "Proxy service"—An intermediary process running on a local computer system or on a distinct computer system or network device (e.g., switch, router, etc.), that functions as an intermediary between an application of the local computer system that access a remote computer over a computer network such as the Internet (for example, a Web browser). Proxies assist with establishing connections between the local and remote computer systems, and can provide a variety of data processing operations for the benefit of the local computer system. Data flow is passed through the proxy, which can monitor, filter, and redirect the data packets as needed according to the beneficial service to be provided by the proxy. For instance, to protect users working on local computer systems, a proxy can analyze the connections to network addresses, and block or redirect network traffic if a connection is suspected of exposing the user's computer system to undue risk (such as the risk of malware or hacker attack). Another example of the data processing operations performed by a proxy is storing copies of frequently-used Web pages (caching) to provide faster loading of those pages.

"TCP/IP input stream"—an incoming series of data in the format of the Internet protocol suite (transmission control protocol/Internet protocol) that includes data and control packets.

"Transparent proxy," "Intercepting proxy"—a proxy that intercepts normal communication at the network layer without requiring any special client configuration to work with the proxy. A transparent proxy intercepts network traffic, including data packets, using such techniques as filter drivers and callbacks associated with events occurring on the monitored transmission control protocol (TCP) socket.

"Malware"—malicious software; any software used to disrupt computer operation, gather sensitive information, or gain access to a computer system in an unauthorized manner. Malware can appear in the form of code, script, active content, and other software. Examples include, viruses, worms, Trojans, ransom-ware, scare-ware, rootkits, bootkits, spyware, etc.

"Module"—a real-world device, component, or arrangement of components implemented using hardware, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of software-controlled hardware. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. In addition, a module can itself be composed of more than one sub-modules, each of which can be regarded as a module in its own right.

"Network attack"—An attempted security breach via a computer network. Examples include interference with communications, gaining unauthorized access, injecting malicious code, denial-of-service attack, etc.

"Object"—a process, a piece of software code, or data structure, stored in computer hardware. Examples include files, programs, data packets, etc.

"Means for receiving a TCP/IP input stream"—computer hardware including a processor, input/output facilities, and data storage, the processor being programmed by instructions stored in the data storage that, when executed, cause the computer hardware to receive a TCP/IP input stream.

"Means for intercepting TCP data packets"—computer hardware including a processor, input/output facilities, and data storage, the processor being programmed by instructions stored in the data storage that, when executed, cause the computer hardware to intercept incoming data packets from a received input stream.

"Means for processing the first TCP data packet asynchronously with respect to reception of other TCP data packets"—computer hardware including a processor, input/output facilities, and data storage, the processor being programmed by instructions stored in the data storage that, when executed, cause the computer hardware to carry out asynchronous processing of a data packet, wherein the asynchronous processing is asynchronous with respect to reception of other TCP data packets.

"Means for setting an indicator to represent an active state of the processing"—computer hardware including a processor, input/output facilities, and data storage, the processor being programmed by instructions stored in the data storage that, when executed, cause the computer hardware to set an indicator in the data store that indicates that the processing is underway.

"Means for sending an output of the processing to a determined destination for the first TCP data packet, and setting the indicator to represent a non-active state of the processing, in response to a conclusion of the processing"—computer hardware including a processor, input/output facilities, and data storage, the processor being programmed by instructions stored in the data storage that, when executed, cause the computer hardware to send an output of the asynchronous processing to an intended destination for the first TCP/IP data packet, and further setting the indicator to indicate that the processing is not underway.

"Means for intercepting TCP control packets"—computer hardware including a processor, input/output facilities, and data storage, the processor being programmed by instructions stored in the data storage that, when executed, cause the computer hardware to intercept incoming TCP control packets.

"Means for checking a state of the indicator"—computer hardware including a processor, input/output facilities, and data storage, the processor being programmed by instructions stored in the data storage that, when executed, cause the computer hardware to read the indicator and compare the state of the indicator to one or more predefined values.

"Means for delaying any sending of the first control packet"—computer hardware including a processor, input/output facilities, and data storage, the processor being programmed by instructions stored in the data storage that, when executed, cause the computer hardware to delay sending of the control packet.

"Means for sending the first control packet to a determined destination for the first control packet in response to the state of the indicator representing the non-active state of the processing"—computer hardware including a processor, input/output facilities, and data storage, the processor being programmed by instructions stored in the data storage that, when executed, cause the computer hardware to check the state of the indicator and, if the indicator indicates the non-active state of the processing, to send the first control packet to its intended destination.

II Description of Preferred Embodiments

Figure 1A:
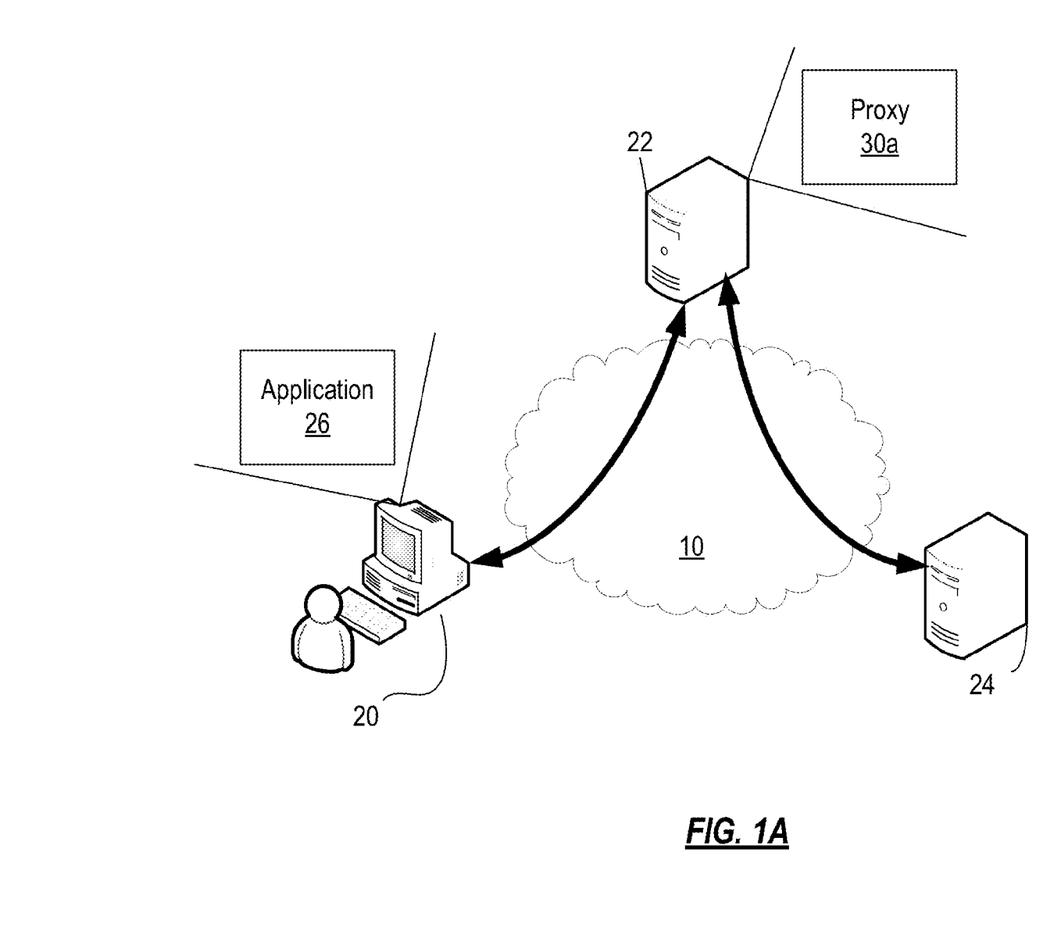
FIGS. 1A and 1B are a block diagrams illustrating exemplary networking environments in which aspects of the invention can be implemented.

FIG. 1A is a block diagram illustrating an exemplary networking environment in which aspects of the invention may be implemented according to one or more of the embodiments detailed below. Internet 10 provides interconnectivity between remote computing systems 20, 22, and 24. Client computing system 20 is a client machine that operates under the control of a user, and seeks to communicate with remote server 24. Client computing system 20 executes an operating system, as well as application 26, which uses the computing system's 20 communications facilities to communicate over Internet 10. Application 26 can be a Web browser, for instance, or a specialized program that uses an Internet connection to exchange information with remote server 24. Remote server 24 can be a Web server, a file server, a software upgrade or licensing server, or the like. Instead of establishing a session directly with remote server 24, client computing system 20 connects though proxy server 22. The connection between client computing system 20 and proxy server 22 can be via the Internet, as depicted, or through a local area network in which client computing system and proxy server 22 are each a node. Proxy server 22 executes an operating system and a proxy application 30*a*, which is programmed to operate as a transparent proxy that intercepts TCP communications and performs some additional processing for the benefit of the user, such as security-related checks, network traffic analysis, malicious object detection, anti-phishing, content filtering, domain name service (DNS) caching, redirecting certain traffic to a more remote preferred server, encrypting or otherwise securing the data being exchanged, or the like.

Figure 1B:
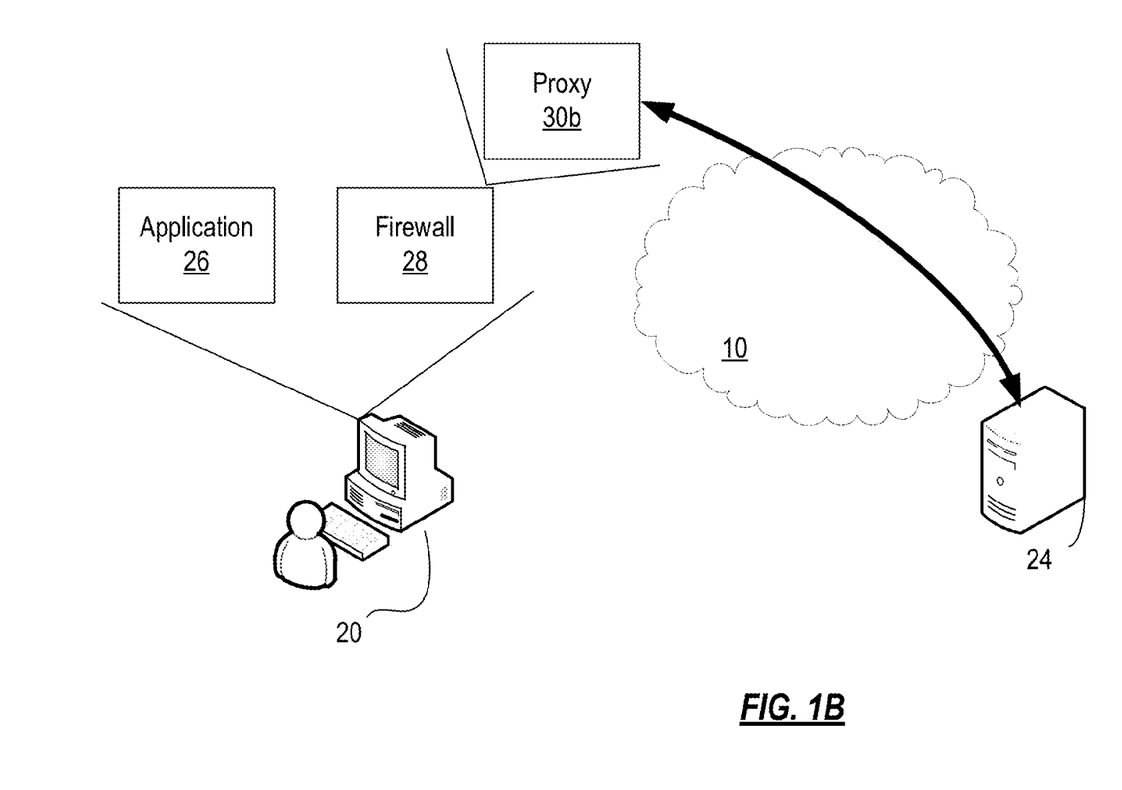

FIG. 1B is a block diagram illustrating another networking arrangement relevant to certain embodiments of the invention. This arrangement differs from the one depicted in FIG. 1A in that client computing system 20 executes a firewall 28, which (among other components) includes proxy application 30*b* that acts as the proxy in lieu of an external, separate, computing device such as a dedicated proxy server. Proxy application 30*b* uses the computing and communication facilities of client computing system 20 to intercept TCP packets and perform the same or similar processing as proxy application 30*a* running on a remote server shown in FIG. 1A.

Figure 2A:
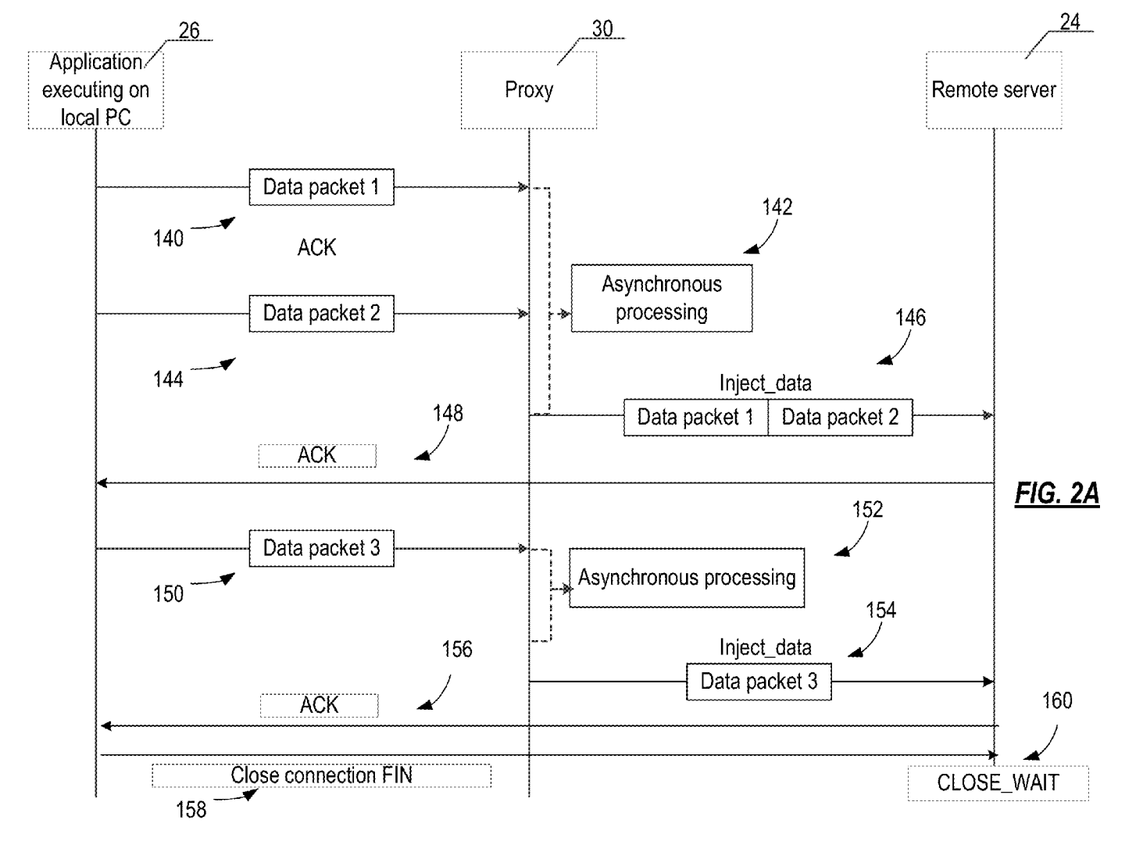
FIG. 2A is a ladder diagram illustrating the operation of a typical proxy application, which represents proxy embodiments according to aspects of the invention.

FIG. 2A is a ladder diagram illustrating the operation of a typical proxy application 30, which represents embodiments such as proxies 30*a* and 30*b*. At 140, application 26 executing on the user's computing system 20 sends data packet 1 addressed to remote server 24. Transparent proxy 30 intercepts data packet 1 and begins asynchronous processing of data packet 1 at 142. The asynchronous processing is asynchronous in the sense that it is not synchronized relative to the activity of application 26 or any other process. The asynchronous processing in this example represents various firewall and antivirus-related operations provided by proxy application 30. Depending on the nature of the asynchronous processing, this activity can take a significant amount of time. For instance, the processing can involve checking the reputation of addressee remote server 24 before permitting data in data packet 1 to be delivered to it. Accordingly, proxy application 30 may need to query one or more databases (possibly located remotely from proxy application 30). Therefore, this example illustrates the transmission of data packet 2 at 144 during the asynchronous processing.

Proxy application 30 receives data packet 2, and proceeds to process it as well. At the completion of the asynchronous processing, as indicated at 146, data packet 1 and data packet 2 are sent to remote server 24. As depicted, the contents of data packet 1 and data packet 2 are re-packetized by proxy application 30. This example represents that proxy application 30 can make such changes, as part of the asynchronous processing. In other cases, the data packets can be left intact, and in still other cases certain data may be extracted from the data packets as part of the operation of proxy application 30.

At 148, a packet containing acknowledgement is sent by remote server 24, and forwarded to application 26 by proxy application 30. This acknowledgement indicates reception of data packets 1 and 2. In a related embodiment, the acknowledgements are sent as individual ACK packets, each corresponding to one certain data packet for reception by application 26.

A further packet, data packet 3 is sent by application 26 at 150. As before, asynchronous processing is carried out in response to data packet 3 by proxy application 30 at 152. At 154, data packet 3, or a reprocessed version of its contents, is sent to remote server 24, which responds with an acknowledgement at 156. At 158, application concludes the session with a FIN command, which is forwarded by proxy 30 to remote server 24. In turn, remote server 24 concludes the session at 160.

Figure 2B:
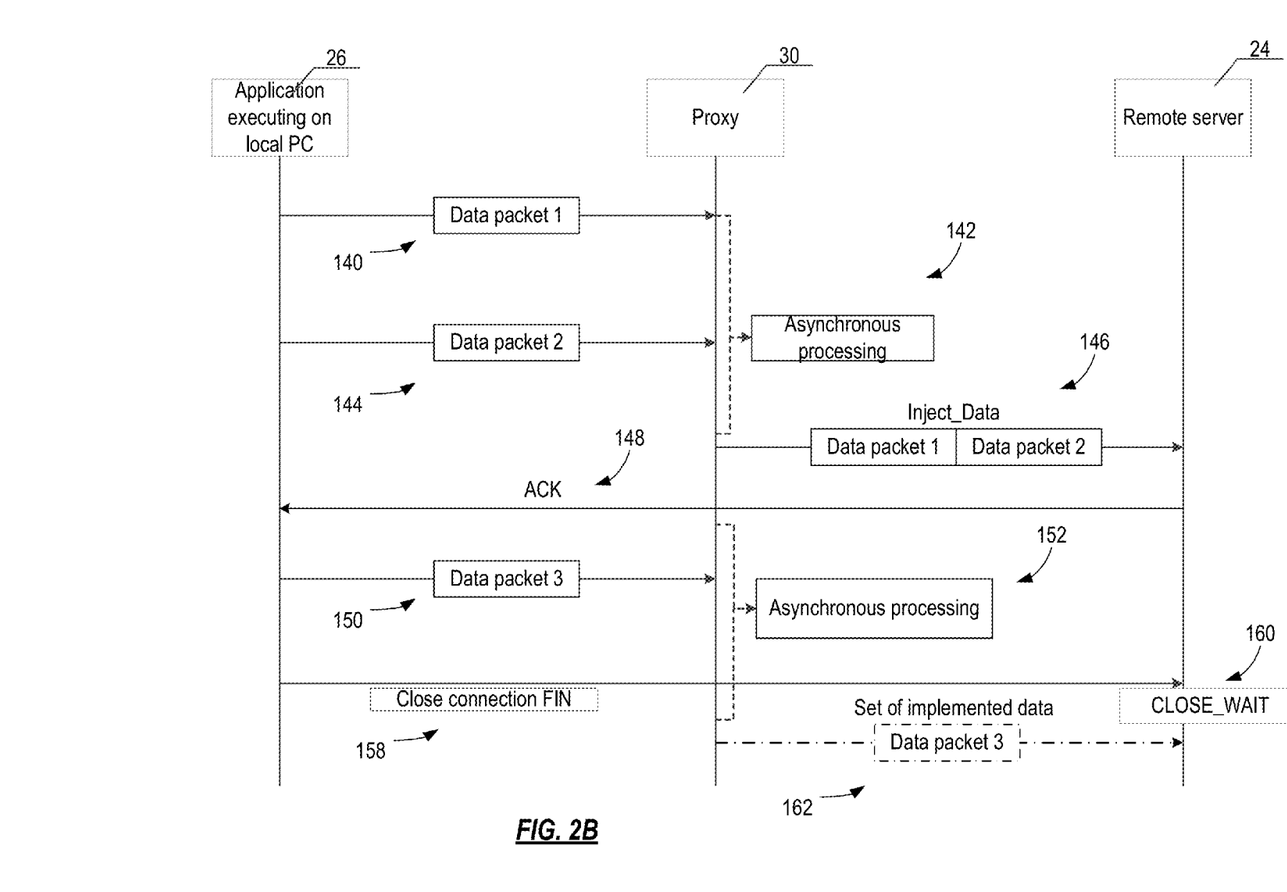
FIG. 2B illustrates an example transparent operation in which an irregularity is present.

In the above example, operation of proxy application 30 is without any irregularities, and all of the data packets were duly sent and received as intended. FIG. 2B illustrates an example operation in which an irregularity is present. In this example, the session proceeds as described above, except that during the asynchronous processing of data packet 3 at 152, a close connection command is sent at 158. This can happen if the user terminates application 26 or if some other event causes application 26 to suddenly conclude the session. Proxy application 30 proceeds to forward the control packet to remote server 24, which at 160 receives the packet and updates the TCP state to close the session. These events occur before the conclusion of the asynchronous processing of data packet 3 indicated at 152. Accordingly, data packet 3 is not transmitted to remote server 24, as indicated at 162. This problem can be quite common in servers lacking an active keep-alive mechanism.

Figure 3:
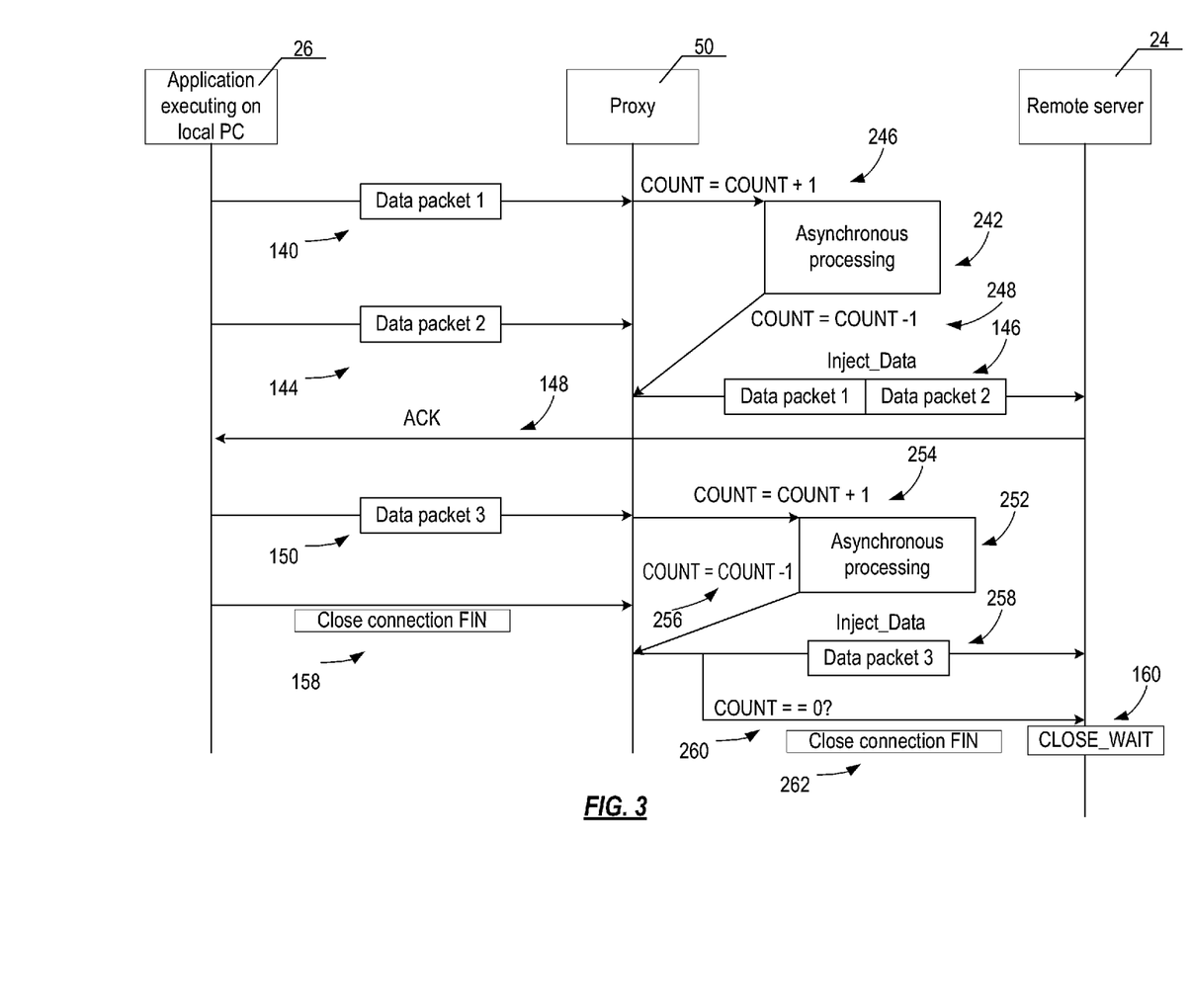
FIG. 3 illustrates an exemplary proxy operation in which a solution according to one embodiment of the invention is applied.

FIG. 3 illustrates a solution according to one embodiment of the invention. Proxy application 50 includes a tracking mechanism to indicate when the asynchronous processing is taking place, and when the asynchronous processing is concluded. In addition, proxy application 50 includes a mechanism to delay transmission of control packets. Operation of these mechanism is illustrated. In response to receipt of data packet 1 by proxy application 50, an indicator is set at 246 to represent the asynchronous processing taking place. This indicator can be represented by a counter, as depicted in FIG. 3 according to one embodiment. In a related embodiment, the indicator can be implemented as a status flag.

As asynchronous processing proceeds at 242 and, at its conclusion, the indicator is changed to indicate the conclusion of the asynchronous processing. During the asynchronous processing, data packet 2 is received at 144, and is handled similarly to the cases described previously. A difference is realized during the asynchronous processing at 252 of data packet 3. The indicator is set at 254 in response to the start of the asynchronous processing. During this time, a close connection command, sent at 158, is received at the proxy application 50. In response, a test is made as to the state of the indicator. If the indicator represents ongoing asynchronous processing by proxy application 50, the close connection command is not automatically forwarded as was the case in the conventional examples above. Rather, the close connection command is held until the indicator is cleared at 256 in response to the conclusion of the asynchronous processing. At this point, data packet 3, now reprocessed, has been sent to remote server 24 at 258 as the final step in the asynchronous processing. Upon the clearing of the indicator, as tested at 260, the close connection packet is forwarded at 262. Remote server 24 closes the session at 160, but only after receiving data packet 3 at 258.

In a related embodiment, when the indicator is implemented as a counter, the count is incremented to represent intercepted data to be asynchronously processed, but with this processing not yet completed. Until the counter is reset to zero, the system holds, i.e., delays, the ACK and FIN packets from being sent to application 26. Accordingly, there are two related roles for the counter in this embodiment. During operation, the counter typically varies among a range of a non-zero values, but also does not undergo continuous increase. This indicates that asynchronous processing is being executed, and that FIN packets should be held. In the case where the counter increases during processing, this indicates that the asynchronous processing is not keeping up with the inflow of data. Accordingly, in one embodiment, a limit, Nmax, is defined for the counter. When Nmax is met or exceeded, the ACK packets are withheld to cause application 26 to limit the rate of data transmissions to allow the asynchronous processing to catch back up to avoid input buffer overflow.

Figure 4:
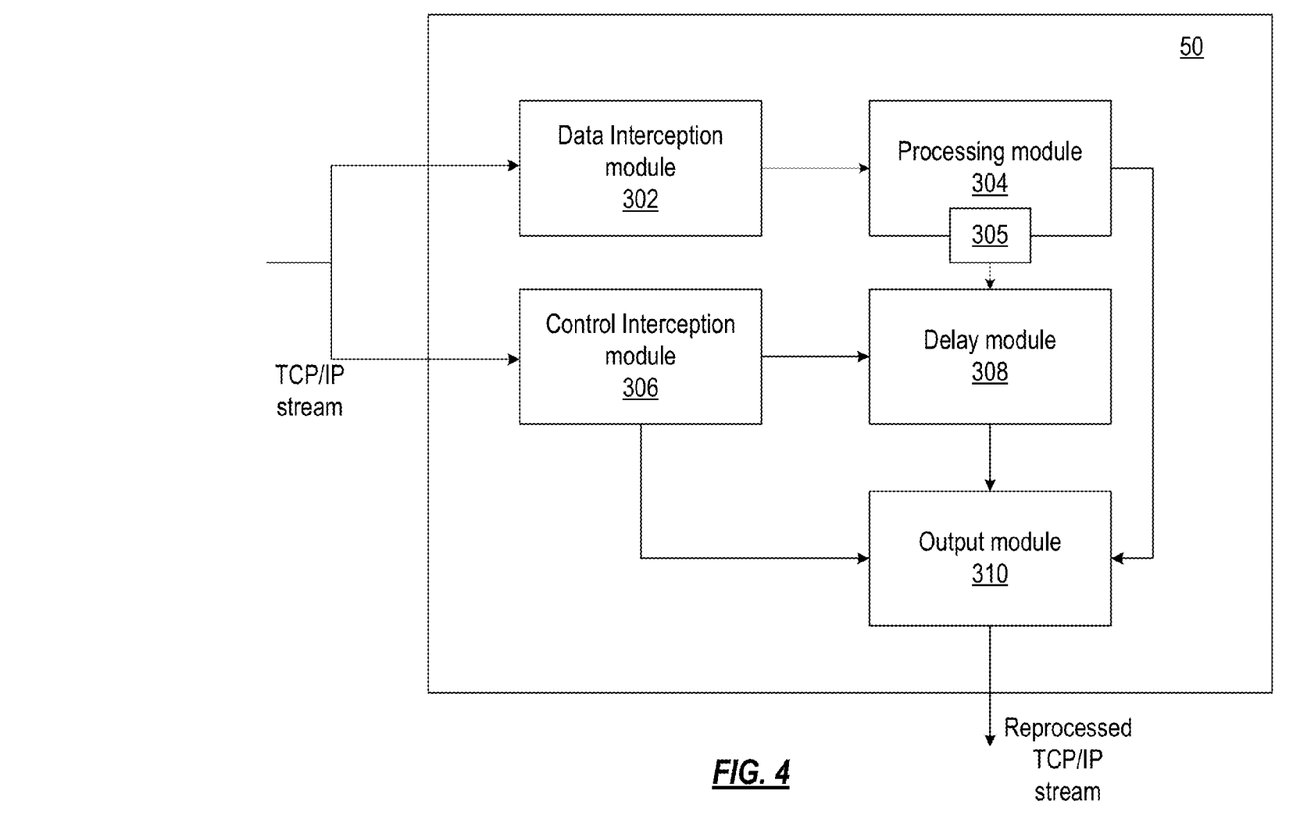
FIG. 4 is a block diagram illustrating some of the relevant modules that make up a proxy application according to a related aspect of the invention.

FIG. 4 is a block diagram illustrating some of the relevant modules that make up proxy application 50 according to a related aspect of the invention. Each of the modules is constructed, programmed, or otherwise configured, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

In this example embodiment, data interception module 302 listens to the TCP/IP input stream from application 26, and intercepts TCP data packets, parses their contents, and extracts relevant data to be forwarded to processing module 304. In one example, application data in particular is extracted for antivirus-related operations, such as firewall operations and malicious object detection. For example, one type of asynchronous processing includes network attack blocking in which inbound traffic is scanned for activity typical of network attacks. Upon detecting an attempted attack, processing module 304 configures the firewall to block any network activity of the attacking source towards the local computer system. As another exemplary of asynchronous processing, incoming HTTP traffic is scanned for the presence of malicious programs, scripts, or other data structures. In cases where a benign object is infected with malicious code, it may be possible to treat the object to remove the malicious infection as part of the asynchronous processing. A variety of other functionality of processing module 304 is contemplated including, without limitation, partial malware checking directed to blocks of objects being downloaded before completion of the download of the entire objects.

Processing module 304 performs the asynchronous processing as described above, and, once complete, forwards the re-processed data to output module 310, which packetizes the data, if necessary, and injects the reprocessed data packets into the output stream addressed to its destination.

Control interception module 306 also listens to the TCP/IP input stream, but intercepts only control packets. The intercepted control packets are passed to delay module 308, which determines, based on the indicator (e.g., counter, flag but, etc.) representing the state of asynchronous processing. If the processing is taking place, the delay module 308 holds the control packed. Otherwise, if the asynchronous processing is not taking place, the delay module 308 releases the control packet to the output module to be transmitted to its destination.

In various embodiments, the asynchronous processing state indicator is provided by indicator module 305 that monitors the asynchronous processing module 304 and reports its status to delay module 308. In one embodiment, indicator module 305 is incorporated as part of processing module 304; in another embodiment, indicator module 305 is distinct from, but operatively coupled to, processing module 304.

Figure 5:
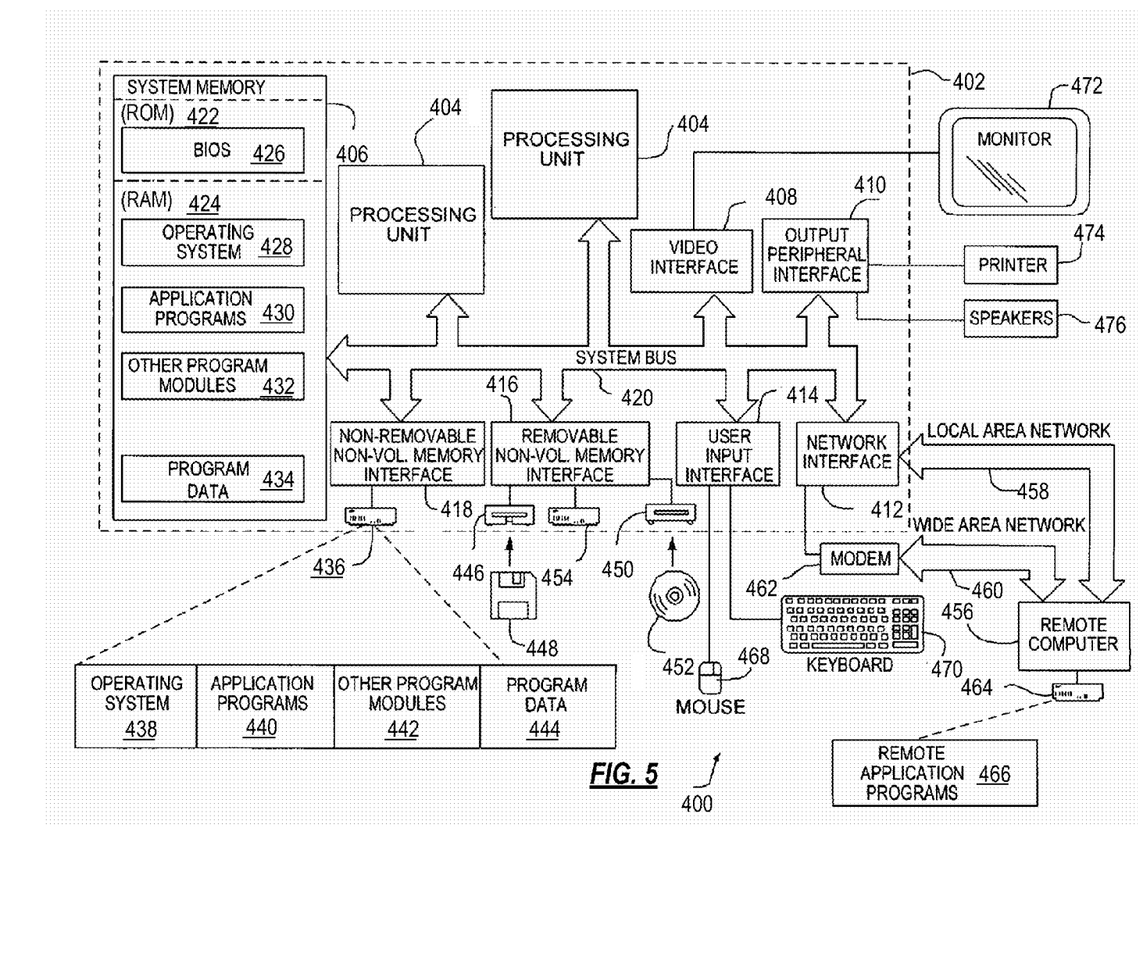
FIG. 5 is a diagram illustrating in greater detail a computer system 400 on which aspects of the invention as described herein may be implemented according to various embodiments.

FIG. 5 is a diagram illustrating in greater detail a computer system 400 on which aspects of the invention as described herein may be implemented according to various embodiments. The computer system 400 may include a computing device such as a personal computer 402. The personal computer 402 includes one or more processing units 404, a system memory 406, a video interface 408, an output peripheral interface 410, a network interface 412, a user input interface 414, removable 416 and non-removable 418 memory interfaces and a system bus or high-speed communications channel 420 coupling the various components. In various embodiments, the processing units 404 may have multiple logical cores that are able to process information stored on computer readable media such as the system memory 406 or memory attached to the removable 416 and non-removable 418 memory interfaces 418. The computer 402 system memory 406 may include non-volatile memory such as Read Only Memory (ROM) 422 or volatile memory such as Random Access Memory (RAM) 424. The ROM 422 may include a basic input/output system (BIOS) 426 to help communicate with the other portion of the computer 402. The RAM 424 may store portions of various software applications such as the operating system 428, application programs 430 and other program modules 432. Further, the RAM 424 may store other information such as program or application data 434. In various embodiments, the RAM 424 stores information that requires low-latencies and efficient access, such as programs and data being manipulated or operated on. In various embodiments RAM 424 comprises Double Data Rate (DDR) memory, Error Correcting memory (ECC) or other memory technologies with varying latencies and configurations such as RAMBUS or DDR2 and DDR3. In this way, in various embodiments, the system memory 406 may store the input data store, access credential data store, operating memory data store, instruction set data store, analysis result data store and the operating memory data store. Further, in various embodiments, the processing units 404 may be configured to execute instructions that limit access to the aforementioned data stores by requiring access credential before access to the information is granted.

The removable 416 and non-removable 418 memory interfaces may couple the computer 402 to disk drives 436 such as SSD or rotational disk drives. These disk drives 436 may provide further storage for various software applications such as the operating system 438, application programs 440 and other program modules 442. Further, the disk drives 436 may store other information such as program or application data 444. In various embodiments, the disk drives 436 store information that doesn't require the same low-latencies as in other storage mediums. Further, the operating system 438, application program 440 data, program modules 442 and program or application data 444 may be the same information as that stored in the RAM 424 in various embodiments mentioned above or it may be different data potentially derivative of the RAM 424 stored data.

Further, the removable non-volatile memory interface 416 may couple the computer 402 to magnetic portable disk drives 446 that utilize magnetic media such as the floppy disk 448, Iomega® Zip or Jazz, or optical disk drives 450 that utilize optical media 452 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 402 may utilize the network interface 412 to communicate with one or more remote computers 456 over a local area network (LAN) 458 or a wide area network (WAN) 460. The network interface 412 may utilize a Network Interface Card (NIC) or other interface such as a modem 462 to enable communication. The modem 462 may enable communication over telephone lines, coaxial, fiber optic, powerline, or wirelessly. The remote computer 456 may contain a similar hardware and software configuration or may have a memory 464 that contains remote application programs 466 that may provide additional computer readable instructions to the computer 402. In various embodiments, the remote computer memory 464 can be utilized to store information such as identified file information that may be later downloaded to local system memory 406. Further, in various embodiments the remote computer 456 may be an application server, an administrative server, client computers, or a network appliance.

A user may enter information to the computer 402 using input devices connected to the user input interface 414 such as a mouse 468 and keyboard 470. Additionally, the input device may be a trackpad, fingerprint scanner, joystick, barcode scanner, media scanner or the like. The video interface 408 may provide visual information to a display such as a monitor 472. The video interface 408 may be an embedded interface or it may be a discrete interface. Further, the computer may utilize a plurality of video interfaces 408, network interfaces 412 and removable 416 and non-removable 418 interfaces in order to increase the flexibility in operation of the computer 402. Further, various embodiments utilize several monitors 472 and several video interfaces 408 to vary the performance and capabilities of the computer 402. Other computer interfaces may be included in computer 402 such as the output peripheral interface 410. This interface may be coupled to a printer 474 or speakers 476 or other peripherals to provide additional functionality to the computer 402.

Various alternative configurations and implementations of the computer 402 are within the spirit of the invention. These variations may include, without limitation, additional interfaces coupled to the system bus 420 such as universal serial bus (USB), printer port, game port, PCI bus, PCI Express or integrations of the various components described above into chipset components such as the northbridge or southbridge. For example, in various embodiments, the processing unit 404 may include an embedded memory controller (not shown) to enable more efficient transfer of data from the system memory 406 than the system bus 420 may provide.

Figure 6:
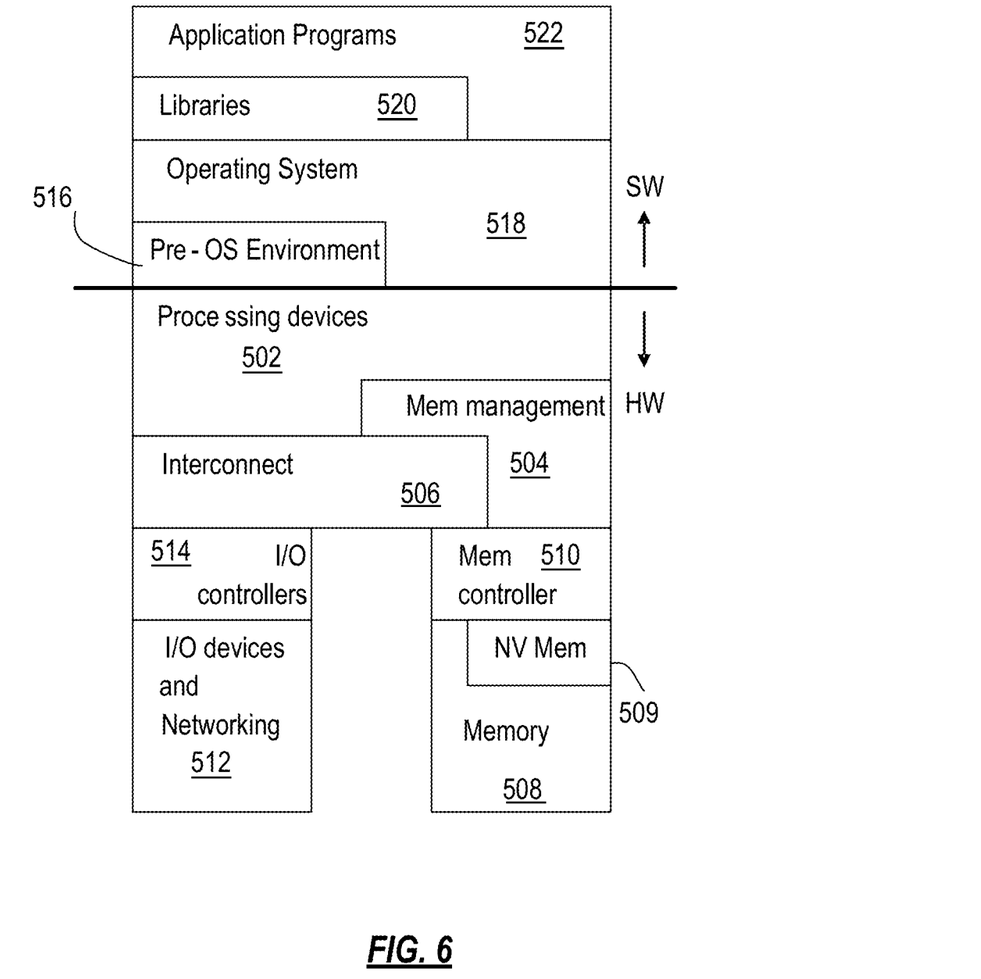
FIG. 6 is a diagram illustrating an exemplary hardware and software architecture of a computer system such as the one depicted in FIG. 5, in which various interfaces between hardware components and software components are shown.

FIG. 6 is a diagram illustrating an exemplary hardware and software architecture of a computer system such as the one depicted in FIG. 5, in which various interfaces between hardware components and software components are shown. As indicated by HW, hardware components are represented below the divider line, whereas software components denoted by SW reside above the divider line. On the hardware side, processing devices 502 (which can include one or more microprocessors, digital signal processors, etc., each having one or more processor cores, are interfaced with memory management device 504 and system interconnect 506. Memory management device 504 provides mappings between virtual memory used by processes being executed, and the physical memory. Memory management device 504 can be an integral part of a central processing unit which also includes the processing devices 502.

Interconnect 506 includes the memory, data, and control busses, as well as the interface with peripherals, e.g., PCI, USB, etc. Memory 508 (e.g., dynamic random access memory—DRAM) and non-volatile memory 509 such as flash memory (i.e., electrically-erasable read-only memory—EEPROM) are interfaced with memory management device 504 and interconnect 506 via memory controller 510. This architecture can support direct memory access (DMA) by peripherals. I/O devices, including video and audio adapters, disk storage, external peripheral busses such as USB, Bluetooth, etc, as well as network interface devices such as those communicating via Ethernet or Wi-Fi interfaces, are collectively represented as I/O devices and networking 512, which interface with interconnect 506 via corresponding I/O controllers 514.

On the software side, a pre-operating system (pre-OS) environment 516, which is executed at initial system start-up and is responsible for initiating the boot-up of the operating system. One traditional example of pre-OS environment 516 is a system basic input/output system (BIOS). In present-day systems, a unified extensible firmware interface (UEFI) is implemented. Pre-OS environment 516, described in greater detail below, is responsible for initiating the launching of the operating system, but also provides an execution environment for embedded applications according to certain aspects of the invention. Operating system 518 provides a kernel that controls the hardware devices, manages memory access for programs in memory, coordinates tasks and facilitates multitasking, organizes data to be stored, assigns memory space and other resources, loads program binary code into memory, initiates execution of the application program which then interacts with the user and with hardware devices, and detects and responds to various defined interrupts. Also, operating system 518 provides device drivers, and a variety of common services such as those that facilitate interfacing with peripherals and networking, that provide abstraction for application programs so that the applications do not need to be responsible for handling the details of such common operations. Operating system 518 additionally provides a graphical user interface (GUI) that facilitates interaction with the user via peripheral devices such as a monitor, keyboard, mouse, microphone, video camera, touchscreen, and the like.

Libraries 520 include collections of program functions that provide further abstraction for application programs. These include shared libraries, dynamic linked libraries (DLLs), for example. Libraries 520 can be integral to the operating system 518, or may be added-on features, or even remotely-hosted. Libraries 520 define an application program interface (API) through which a variety of function calls can be made by application programs to invoke the services provided by the operating system 518. Application programs 522 are those programs that perform useful tasks for users, beyond the tasks performed by lower-level system programs that coordinate the basis operability of the computer system itself.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a computing system, that includes a processor, data storage, input/output devices including a network interface device, and an operating system, a method for providing transparent proxy services, the method comprising:
   receiving, by the computing system, a TCP/IP input stream that includes data and control packets directed to a destination address that is different from a network address of the computing system;
   in response to the receiving, intercepting, by the computing system, TCP data packets;
   in response to the intercepting of a first TCP data packet, processing, by the computing system, the first TCP data packet asynchronously with respect to handling of received TCP data packets;
   in response to a start of the processing, setting, by the computing system, an indicator to represent an active state of the processing;
   in response to a conclusion of the processing, sending, by the computing system, an output of the processing to a determined destination for the first TCP data packet, and setting, by the computing system, the indicator to represent a non-active state of the processing;
   in response to the receiving, intercepting, by the computing system, TCP control packets;
   in response to intercepting a first TCP control packet, checking, by the computing system, a state of the indicator;
   in response to the state of the indicator representing the active state of the processing, delaying, by the computing system, any sending of the first control packet; and
   in response to the state of the indicator representing the non-active state of the processing, sending, by the computing system, the first control packet to a determined destination for the first control packet.

2. The method of claim 1, wherein setting the indicator includes initializing a counter, and further comprising: incrementing the counter in response to a reception of a data packet, and decrementing the counter in response to completion of processing of that data packet.

3. The method of claim 2, further comprising:
   wherein the first control packet is a FIN packet, and wherein delaying of the FIN packet is based on whether the value of the counter is zero.

4. The method of claim 2, further comprising:
   comparing a value of the counter against a predefined limit; and
   wherein the first control packet is an ACK packet, and wherein delaying of the ACK packet is based on whether the value of the counter is below the predefined limit.

5. The method of claim 1, wherein the processing includes detecting and preventing network attacks, including monitoring incoming data for indicia of network attacks.

6. The method of claim 1, wherein the processing includes detecting and removing malware from incoming data.

7. The method of claim 1, wherein the processing includes performing malware analysis on partially-downloaded objects.

8. A system for providing reliable proxy services, comprising:
   computing hardware, including a processor, data storage, and input/output devices including a network interface device;
   instructions executable on the computing hardware and stored in a non-transitory storage medium that, when executed, cause the computing hardware to implement:
      a data interception module configured to intercept incoming TCP/IP data packets;
      a control interception module configured to intercept TCP/IP control packets;
      a processing module configured to process a first intercepted TCP data packet asynchronously with respect to reception of other TCP data packets;
      an indicator module configured to monitor an operational state of the processing module, and to provide an indication representing that state as being either active or inactive, based on a result of monitoring the operational state;
      a delay module configured to delay retransmission of a first received control packet in response to the operational state of the processing module being active, as indicated by the indicator module, and to retransmit the first received control packet in response to the operational state being inactive, as indicated by the indicator module; and
      an output module configured to transmit an output of the processing module and an output of the delay module based on a determined destination for each corresponding output.

9. The system of claim 8, wherein the system is implemented as a transparent proxy server on a computer network.

10. The system of claim 8, wherein the system is implemented on a client computing system.

11. The system of claim 8, wherein the indicator module implements a counter that is incremented in response to a reception of a data packet, and decremented in response to completion of processing of that data packet.

12. The system of claim 11, further comprising:
wherein the first control packet is a FIN packet, and wherein the delay module is configured to delay the FIN packet based on whether the value of the counter is zero.

13. The system of claim 11, wherein the delay module is configured to compare a value of the counter against a predefined limit; and
wherein the first control packet is an ACK packet, and wherein the delay module is configured to delay the ACK packet based on whether the value of the counter is below the predefined limit.

14. The system of claim 8, wherein the indicator module implements a flag that is set in response to a reception of a data packet, and cleared in response to completion of processing of that data packet.

15. The system of claim 8, wherein the processing module is further configured to detect and prevent network attacks, including monitoring incoming data for indicia of network attacks.

16. The system of claim 8, wherein the processing module is further configured to detect and remove malware from incoming data.

17. The system of claim 8, wherein the processing module is further configured to perform malware analysis on partially-downloaded objects.

18. In a computer system that includes a processor, data storage, input/output devices including a network interface device, and an operating system, a system for providing transparent proxy services, the system comprising:

means for receiving a TCP/IP input stream that includes data and control packets directed to a destination address that is different from a network address of the computing system;

means for intercepting, in response to the receiving, TCP data packets;

means for processing, in response to the intercepting of a first TCP data packet, the first TCP data packet asynchronously with respect to reception of other TCP data packets;

means for setting an indicator to represent an active state of the processing in response to a start of the processing;

means for sending an output of the processing to a determined destination for the first TCP data packet, and setting the indicator to represent a non-active state of the processing, in response to a conclusion of the processing;

means for intercepting TCP control packets in response to the receiving;

means for checking a state of the indicator in response to intercepting a first TCP control packet;

means for delaying any sending of the first control packet in response to the state of the indicator representing the active state of the processing; and means for sending the first control packet to a determined destination for the first control packet in response to the state of the indicator representing the non-active state of the processing.

\* \* \* \* \*